United States Patent [19]

Cuscurida et al.

[11] Patent Number: 4,990,576
[45] Date of Patent: Feb. 5, 1991

[54] TETRAMINES BY AMINATION OF POLYOXYALKYLENE GLYCOLS

[75] Inventors: Michael Cuscurida, Austin; Jiang-Jen Lin, Houston, both of Tex.

[73] Assignee: Texaco Chemical Company, White Plains, N.Y.

[21] Appl. No.: 429,672

[22] Filed: Oct. 31, 1989

[51] Int. Cl.$^5$ .................. C08G 65/28; C08G 65/32
[52] U.S. Cl. .................................. 525/409; 528/408; 528/421; 564/505
[58] Field of Search ............... 564/505; 528/408, 421; 525/409

[56] References Cited

U.S. PATENT DOCUMENTS

| | | | |
|---|---|---|---|
| 2,923,696 | 2/1960 | Harwell et al. | 260/47 |
| 3,347,926 | 10/1967 | Zech | 260/585 |
| 3,373,204 | 3/1968 | Hales et al. | 260/570.7 |
| 3,390,184 | 6/1968 | Moss et al. | 260/585 |
| 3,654,370 | 4/1972 | Yeakey | 260/584 B |
| 3,847,992 | 11/1974 | Moss | 564/505 X |
| 4,130,590 | 12/1978 | Hobbs et al. | 260/585 D |
| 4,181,682 | 1/1980 | Watts et al. | 564/505 |
| 4,235,811 | 11/1980 | Schulze et al. | 564/505 X |
| 4,383,100 | 5/1983 | Pechhold | 528/76 |
| 4,409,399 | 10/1983 | Swift et al. | 564/473 |
| 4,691,000 | 9/1987 | Collart et al. | 528/244 |

Primary Examiner—Earl Nielsen
Attorney, Agent, or Firm—Jack H. Park; Kenneth R. Priem; David L. Mossman

[57] ABSTRACT

A process in which a di-trimethylol alkane initiator is oxyalkylated to form an alkylene oxide adduct which is then catalytically aminated to provide, for example, a tetramine. These compounds are useful for preparing polyurethane products and as curing agents for epoxy resins.

7 Claims, No Drawings

TETRAMINES BY AMINATION OF POLYOXYALKYLENE GLYCOLS

CROSS REFERENCE TO RELATED APPLICATIONS

This application is related to U.S. Patent Application for Tetramines by Amination of Dialdehyde Glycol Adducts by Michael Cuscurida, Jiang-Jen Lin and David R. McCoy, Ser. No. 429,671, filed of even date and to U.S. Patent Application for Preparation of Aminotetramines by Michael Cuscurida, Wei-Yang Su and George P. Speranza, Ser. No. 429,673, filed of even date.

BACKGROUND OF THE INVENTION

1. Field of the Invention

This invention relates to tetramines and to a method for their preparation by amination of alkylene oxide adducts of di-trimethylol alkane initiators. The products of this invention are useful in preparing RIM elastomers, coatings and polyamides and in the curing of epoxy resins as well as in making other polyurethane products.

2. Prior Art

The amination of long alkoxylated alkyl chains terminated by hydroxyl groups is well known in the art.

U.S. Pat. No. 3,654,370 to E. L. Yeakey teaches the amination of polyoxyalkylene polyols to form the corresponding amines by means of ammonia and hydrogen over a catalyst prepared by the reduction of a mixture of the oxides of nickel, copper and chromium. The amination is carried out at a temperature of 150° to 275° C. and 500 to 5000 psig.

U.S. Pat. No. 4,409,399 to H. E. Swift et al., teaches a catalyst for aminating aliphatic alcohols and aldehydes. The unsupported catalyst comprises (1) copper oxide or copper hydroxide, and (2) nickel oxide or nickel hydroxide, and optionally (3) an oxide or hydroxide of a Group IIA; e.g., magnesium, barium. The reaction is carried out at a temperature of 150° to 250° C. and 1 to 100 atm with continuous water removal.

U.S. Pat. No. 3,390,184 to P. H. Moss et al., teaches a process for converting a secondary alcohol to a high-molecular weight primary amine by means of a hydrogenation-dehydrogenation catalyst comprising at least one member selected from the group consisting of the metals and oxides of nickel and cobalt, together with copper and a metal oxide selected from the group consisting of chromium oxide, molybdenum oxide, manganese oxide and thorium oxide. The reaction is carried out at a temperature of 225° to 260° C. and pressure of 2000 to 4000 psig, with ammonia as the aminating agent.

U.S. Pat. No. 3,373,204 to R. A. Hales et al., teaches a catalytic process for producing secondary amines from derivatives of phenols, alcohols and amines containing 5 to 40 moles of ethylene oxide and propylene oxide. The catalyst is Raney nickel with ammonia or primary alkylamines as the aminating agent. The reaction is carried out at 200° to 275° C. with the evolution of water. Amines include lauryl amine, hexadecyl amine, octadecyl amine, rosin amine and fatty acid amines.

U.S. Pat. No. 3,347,926 to J. D. Zech teaches a catalytic process for aminating primary and secondary aliphatic alcohols. The catalyst comprises a chromium-promoted Raney nickel. The reaction is carried out at 150° to 275° C. with ammonia, primary amines or secondary amines of 1 to 6 carbon atoms.

U.S. Pat. No. 2,923,696 to K. E. Harwell et al., teaches resinous compositions formed by the reaction of an epoxy resin with a high-boiling amine product. The patent further teaches hydrogenation catalysts employing copper, nickel, cobalt and oxides thereof.

U.S. Pat. No. 4,130,590 to Hobbs et al., teaches the production of long-chain unsaturated amines such as N-(alkadienyl)amines and saturated or hydrated derivatives thereof.

U.S. Pat. No. 3,654,370 to E. Pechhold teaches a process for preparing a polyurethane which is the reaction product of (a) an oligomer formal diol made by coupling segments of copolymers of tetrahydrofuran and an alkylene oxide, such as propylene oxide, with formaldehyde, (b) an organic polyisocyanate and a chain extender as exemplified by ethylene glycol, glycerine, etc.

U.S. Pat. No. 4,691,000 to Andre Collart et al., teaches a process for preparing copolymers containing oxymethylene and 2-fluoromethoxyethylene repeating units formed by copolymerizing trioxane with a derivative of a cyclic ether, such as epifluorohydrin.

SUMMARY OF THE INVENTION

This invention relates to compounds of the formula:

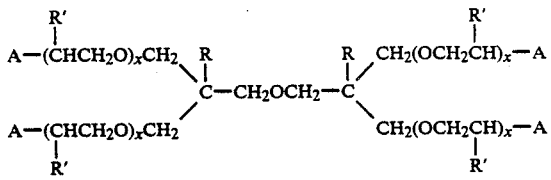

wherein:

R is alkyl of from 1 to 5 carbon atoms,

R' is selected from the group consisting of hydrogen, the methyl radical and the ethyl radical.

x ranges from 2 to about 50,

A is $-NH_2$ or $-OH$, and wherein at least one of the A substituents is $-NH_2$. In addition to the products of this invention where the four A substituents are $-NH_2$ groups, this invention also relates to compounds wherein one, two, or three of the A substituents are $-NH_2$ groups with the balance of the A substituents being $-OH$ groups. Preferably, R is the ethyl radical and x ranges from 2 to about 25.

The process for preparing the amine products of this invention comprises:

(1) alkoxylating a di-trimethylol alkane, such as a di-trimethylol ethane or di-trimethylol propane, with an alkylene oxide selected from the group consisting of ethylene oxide, propylene oxide, butylene oxide, and mixtures thereof to form the alkylene oxide adduct of the alkane initiator, and (2) catalytically aminating the said alkylene oxide adduct in the presence of hydrogen and ammonia to form the amine product.

The products of this invention which are liquids can be prepared with a wide variety of molecular weights by controlling the addition of alkylene oxide in the alkoxylation step. The stability of the ether linkage in the center of the amine compound molecules is indicated by the fact that the products are colorless.

The amine compounds of this invention are useful for reaction with isocyanates to manufacture articles by a Reaction Injection Molding (RIM) process. Reaction Injection Molding (RIM) is a technique for the rapid mixing and molding of large, fast-curing urethane parts. RIM polyurethane parts are used in a variety of exterior body applications on automobiles where the light weight contributes to energy conservation. RIM parts are generally made by rapidly mixing active hydrogen-containing materials with polyisocyanate and placing the mixture into a mold where reaction proceeds. After reaction and demolding, the parts may be subjected to an additional curing step which comprises placing the parts in an oven, held at 250° F. or higher.

It also has been found that the products of this invention are useful as curing agents in forming epoxy resin compositions, castings and coatings, etc. with highly satisfactory physical properties. Such epoxy products find application in a wide variety of industrial products. Polyamides can be prepared by allowing the compounds of this invention to react with dibasic acids, diesters and diacid chlorides.

DESCRIPTION OF THE PREFERRED EMBODIMENTS

The alkoxylation reaction employed in preparing the alkylene oxide adduct of the di-trimethylol alkane initiator in the first step of the process utilized in preparing the amine compounds of this invention is carried out according to methods well known in the art and as described in Example 1.

The alkylene oxide adducts of the di-trimethylol alkane initiators are aminated as set out in U.S. Pat. No. 3,654,370 to E. L. Yeakey, which describes the amination of polyoxyalkylene polyols to form the corresponding amines. The amination is conducted in the presence of a catalyst prepared, for example, from a mixture of the oxides of nickel, copper and chromium and in the presence of ammonia and hydrogen at 150° to 275° C., preferably about 190° to about 240° C. and at a pressure of about 1000 to about 5000 psig, preferably at about 1500 to about 2500 psig. Other useful amination catalysts include, for example, Raney nickel, promoted Raney nickel such as molybdenum promoted Raney nickel; Ni/Cu/Cr powder; Ni/Cu/Cr/Mo/Al powder, etc.

The following examples which illustrate the nature of the instant invention are not intended to be limitative.

EXAMPLE 1

Preparation of the Di-Trimethylol Propane-Propylene Oxide Adduct

Into a two gallon kettle were charged 5 lb di-trimethylol propane and 100 g 45% aqueous potassium hydroxide. The reactor was then purged with prepurified nitrogen. Maintaining a nitrogen purge, the reactants were heated to 110° C. and the initiator dried to a water content of 0.08% using vacuum and nitrogen stripping. Propylene oxide (23.2 lb) was then added at 110°–113° C. at 50 psig over a four-hour period. After digestion to an equilibrium pressure, the alkaline product was neutralized at 95° C. by stirring two hours with 300 g of magnesium silicate added as an aqueous slurry. Di-t-butyl p-cresol (18.1 g) was then added to stabilize the polyol. The neutralized product was vacuum stripped to a minimum pressure, nitrogen stripped, and filtered. The finished product had the following properties:

| Sample no. | 6405-53 |
|---|---|
| Properties | |
| Acid no., mg KOH/g | 0.002 |
| Hydroxyl no., mg KOH/g | 211 |
| Water, wt % | 0.088 |
| pH in 10:6 isopropanol-water | 8.1 |
| Color, Pt—Co | 50 |
| Sodium, ppm | 2.1 |
| Potassium, ppm | 3.8 |
| Peroxide, ppm | 0.92 |
| Viscosity, °F., cs | |
| 77 | 623 |
| 100 | 250 |

EXAMPLE 2

Amination of the Di-Trimethylol Propane-Propylene Oxide Adduct of Example 1 Using Ni/Cu/Cr Catalyst To a 300 ml stirred autoclave was charged di-trimethylol propane-propylene oxide adduct of Example 1 (150 g); OH number 211 mg KOH/g and powdered Ni/Cu/Cr catalyst (20 g). The reactor was sealed and flushed with hydrogen and then charged with ammonia (33 g). The reactor was then pressured to 600 psig with hydrogen and heated at 235° C. for 3 hours. A maximum pressure at 2450 psig was recorded. After cooling to room temperature, the excess off-gas was released. The product obtained by filtration and removal of light material was a colorless liquid product. Product analysis: total acetylatables 3.4 meq/g, total amine 2.2 meq/g and primary amine 2.1 meq/g. The degree of amination was 61.8 percent.

EXAMPLE 3

Amination of Di-Trimethylol Propane-Propylene Oxide Adduct of Example 1 Using a Ni/Cu/Cr/Al Catalyst The amination procedure of Example 1 was repeated except using powdered Ni/Cu/Cr/Al catalyst (15 g), di-trimethylol propane propylene oxide adduct of Example 1 (155 g) and ammonia (33 g). The conditions were 230° C., 2750 psig for 3 hours. Product analysis: total acetylatables 3.47 meq/g, total amine 0.208 meq/g and primary amine 0.196 meq/g. The degree of amination was 94 percent.

EXAMPLE 4

Amination of Di-Trimethylol Propane-Propylene Oxide Adduct of Example 1 Using a Ni/Cu/Cr Catalyst Procedures similar to Example 2 were repeated except using di-methylol propane-propylene oxide adduct of Example 1 (150 g), powdered Ni/Cu/Cr catalyst (20 g) and ammonia (35 g). The reaction conditions were 230° C., initial hydrogen pressure 700 psig for 3 hours. The resulting liquid product had the following analysis: total acetylatables 2.57 meq/g, total amine 1.34 meq/g and primary amine 1.32 meq/g. The degree of amination was 52.1 percent.

EXAMPLE 5

Amination of Di-Trimethylol Propane-Propylene Oxide Adduct of Example 1 Using a Ni/Cu/Cr/Mo/Al Catalyst Experimental procedures similar to those of Example 2 were used except using Ni/Cu/Cr/Mo/Al powder (20 g), di-trimethylol propane-propylene adduct of Example 1 (150 g) and ammonia (33 g). The conditions were 237° C., 700 psig initial hydrogen pressure for 3 hours. The resulting product had the following analysis: total acetylatables 3.44 meq/g, total amine 1.43 meq/g, primary amine 1.38 meq/g. The degree of amination was 40 percent.

PREPARATION OF POLYURETHANE PRODUCTS

As previously pointed out the amine compounds of this invention are useful in preparing a wide variety of polyurethane elastomers by reaction with an isocyanate. These amine compounds also can be employed as curing agents in coating compositions with blocked isocyanates in the presence of a solvent.

Isocyanates useful in making the coating compositions of this invention may be aromatic or aliphatic polyisocyanates.

Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These isocyanate compounds are produced by the phosgenation of corresponding methylene-bridged polyphenyl polyamines, which are conventionally produced by the reaction of formaldehyde and primary aromatic amines, such as aniline in the presence of hydrochloric acid and/or other acidic catalysts. Known processes for preparing polyamines and corresponding methylene-bridged polyphenyl polyisocyanates therefrom are described in U.S. Pat. Nos. 2,683,730; 2,950,263; 3,012,008; 3,344,162 and 3,362,979.

Usually methylene-bridged polyphenyl polyisocyanate mixtures contain about 20 to about 100 wt % methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 wt % methylene diphenyldiisocyanate isomers, of which 20 to about 95 wt % thereof is the 4,4'-isomer with the remainder being polymethylene polyphenyl polyisocyanates of higher molecular weight and functionality that have an average functionality of from about 2.1 to about 3.5. These isocyanate mixtures are commercially available and can be prepared by the process described in U.S. Pat. No. 3,362,979 to Floyd E. Bentley.

A blocked isocyanate can be prepared, for example, by reacting a trimethylolpropane-toluene diisocyanate adduct with methyl ethyl ketone oxime in the presence of a suitable solvent.

In forming the coating compositions of this invention solvents such as 2-ethoxyethyl acetate, 2-methoxyethyl acetate, ethyl acetate and t-butyl alcohol, etc. can be employed.

Other conventional additives such as pigments, dyes, flow control agents, flame retardants, antioxidants, etc. may be utilized in the coating compositions.

EXAMPLE 6

Use of the Aminated Di-Trimethylol Propane-Propylene Oxide Adduct of Example 2 as a Curing Agent for Blocked Isocyanate Coating Preparation of the Blocked Isocyanate The blocked isocyanate was prepared by reaction of 1000 g of a trimethylol propane-toluene diisocyanate adduct (Mondur CB-601 PMA, a product of the Mobay Chemical Co.) with 222.5 g methyl ethyl ketone oxime in the presence of 135.9 g 2-ethoxyethyl acetate. The product had an available isocyanate content of 1.84 meq/g.

Coating Preparation

A coating was prepared by mixing 43.8 g of the blocked isocyanate with 46.2 g of the aminated di-trimethylol propane-propylene oxide adduct of Example 2 which had a primary amine content of 2.14 meq/g in the presence of 10 g of 2-ethoxyethyl acetate. A 5-mil wet film of this coating was cured in an oven at 100°–105° C. for one-half hour to form a coating which had a pencil hardness of B-H and a forward/reverse impact resistance of 160 in/lb.

EPOXY RESIN COMPOSITIONS

This invention also relates to epoxy resin compositions such as films, castings, etc., comprising a vicinal polyepoxide having an epoxide equivalency of greater than about 1.8 and a curing amount of an amine compound of this invention.

Generally, the amine-cured, vicinal polyepoxide-containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound; i.e., isopropylidene bisphenol, novolak, resorcinol, etc. The epoxy derivatives of methylene or isopropylidene bisphenols are especially preferred.

A widely-used class of polyepoxides which are useful according to the instant invention includes the resinous epoxy polyethers obtained by reacting an epihalohydrin, such as epichlorohydrin, etc., with either a polyhydric phenol or a polyhydric alcohol. An illustration, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, etc.

Among the polyhydric alcohols which are co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, etc.

Another class of polymeric polyepoxides which can be amine-cured in accordance with the instant invention includes the epoxy novolak resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, or a polyhydric phenol.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *HANDBOOK OF EPOXY RESINS*, pp. 7-14, describes the use of certain amine-containing compounds as epoxy curing agent-accelerators.

Many accelerators are known in the art which can be utilized in accordance with the instant invention. Examples include salts of phenols, salicyclic acids, amine salts of fatty acids, such as those disclosed in U.S. Pat. No. 2,681,901, and tertiary amines such as those disclosed in U.S. Pat. No. 2,839,480.

It will further be realized that various conviently employed additives can be admixed with the polyepoxide-containing composition of the instant invention prior to final cure. For example, in certain instances it may be desired to add minor amounts of hardeners along with various other accelerators and curing agent systems well known in the art. Additionally, conventional pigments, dyes, fillers, flame-retarding agents, etc. can be added.

EXAMPLE 7

Preparation of Heat-Cured Epoxy Resin Coating Using the Aminated Di-Trimethylol Propane-Propylene Oxide Adduct of Example 2 as the Curing Agent The coating was prepared by mixing 10 g Epon® 828, a diglycidyl ether of Bisphenol A made by the Shell Chemical Co., and 12.4 g of the aminated di-trimethylol propane-propylene oxide adduct of Example 2 and curing a 5 mil wet film of this composition for 1.5 hours at 100°–110° C. The resultant film has a pencil hardness of F-H and a forward/reverse impact strength of 160 in/lb.

What is claimed is:

1. A compound of the formula:

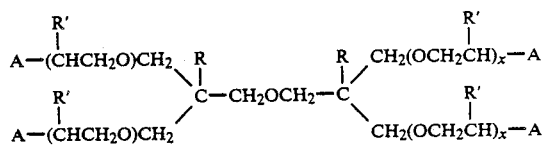

wherein:
R is alkyl of from 1 to 5 carbon atoms,
R' is selected from the group consisting of hydrogen, the methyl radical and the ethyl radical,
x ranges from 2 to about 50,
A is $-NH_2$ or $-OH$, and wherein at least one of the A substituents is $-NH_2$.

2. The compound of claim 1 wherein A is $-NH_2$.

3. The compound of claim 1 wherein R is the methyl radical.

4. The compound of claim 1 wherein R is the ethyl radical.

5. The compound of claim 1 wherein x ranges from 2 to about 50.

6. The compound of claim 1 wherein R is the methyl radical and x ranges from 1 to about 5.

7. The compound of claim 1 wherein R is the ethyl radical and x ranges from 1 to about 5.

* * * * *